US006974597B2

(12) United States Patent
Ohta et al.

(10) Patent No.: US 6,974,597 B2
(45) Date of Patent: Dec. 13, 2005

(54) METHOD OF ENHANCING SALTY TASTE, SALTY TASTE ENHANCER, SALTY TASTE SEASONING AGENT AND SALTY TASTE-ENHANCED FOODS

(75) Inventors: Shigenori Ohta, Komae (JP); Chiaki Saitoh, Inashiki-gun (JP); Hiroaki Iwasaki, Inashiki-gun (JP); Aki Morita, Inashiki-gun (JP)

(73) Assignee: Kyowa Hakko Kogyo Co., Ltd., Tokyo (JP)

( * ) Notice: Subject to any disclaimer, the term of this patent is extended or adjusted under 35 U.S.C. 154(b) by 744 days.

(21) Appl. No.: 09/890,217

(22) PCT Filed: Nov. 29, 2000

(86) PCT No.: PCT/JP00/08391

§ 371 (c)(1),
(2), (4) Date: Jul. 26, 2001

(87) PCT Pub. No.: WO01/39613

PCT Pub. Date: Jun. 7, 2001

(65) Prior Publication Data

US 2003/0091721 A1 May 15, 2003

(30) Foreign Application Priority Data

| Nov. 29, 1999 | (JP) | 11-338530 |
| Nov. 29, 1999 | (JP) | 11-338531 |
| Dec. 24, 1999 | (JP) | 11-368058 |
| Dec. 27, 1999 | (JP) | 11-368059 |

(51) Int. Cl.$^7$ ............................ A23L 2/00; A23L 1/237; A22L 1/227
(52) U.S. Cl. ...................... 426/590; 426/648; 426/649
(58) Field of Search ................ 426/590, 648, 426/649

(56) References Cited

U.S. PATENT DOCUMENTS

| 1,874,055 A | * | 8/1932 | Liebrecht | 426/649 |
| 5,000,977 A | | 3/1991 | Marggrander et al. | 426/649 |
| 5,145,707 A | | 9/1992 | Lee | 426/649 |
| 5,897,908 A | * | 4/1999 | Berglund et al. | 426/649 |
| 6,159,529 A | | 12/2000 | Uchida et al. | 426/649 |

FOREIGN PATENT DOCUMENTS

| EP | 677 249 A2 | 10/1995 |
| JP | 49-126854 | 12/1974 |
| JP | 63-137658 | 6/1988 |
| JP | 2-53456 | 2/1990 |
| JP | 5-184326 | 7/1993 |
| WO | WO 88/06850 | 9/1988 |
| WO | WO 95/04481 | 2/1995 |

OTHER PUBLICATIONS

Arai, et al., "Glutamyl Oligopeptides as Factors Responsible for . . . ", Agr. Biol. Chem., vol. 36, No. 7 (1972)., pp. 1253–1256.

Arai, et al., "Tastes of L–Glutamyl Oligopeptides in Relation to Their . . . ", Agr. Biol. Chem., vol. 37, No. 1 (1973), pp. 151–156.

Fujimaki, et al., "Taste Peptide Fractionation from a Fish Protein Hydrolysate", Agr. Biol. Chem., vol. 37, No. 12 (1973), pp. 2891–2898.

Noguchi, et al., "Isolation and Identification of Acidic Oligopeptides . . . ", J. Agr. Food Chem, vol. 23, No. 1 (1975), pp. 49–53.

Tamura, et al., "The Relationship Between Taste and Primary Structure . . . ", Agric. Biol. Chem., vol. 53, No. 2 (1989), pp. 319–325.

Nakata, et al., "Role of Basic and Acidic Fragments in Delicious . . . ", Biosci. Biotech Biochem, vol. 59, No. 4 (1995), pp. 689–693.

Ishii, et al., "Tastes of Peptides in Wheat Gluten Hydrolyzate . . . ", vol. 45, No. 7 (1994), pp. 615–620 (Abstract).

Maehashi, et al., "Isolation of Peptides from an Enzymatic . . . ", Biosci. Biotech Biochem, V I. 63, No. 3 (1999), pp. 555–559.

Noguchi, et al., "On the Bitter–Masking Activity of a Glutamic . . . ", Journal of Food Science, vol. 40 (1975), pp. 367–369.

Seki, et al., "Further Study on the Salty Peptide . . . ", J. Argic. Food Chem., vol. 38, No. 1 (1990), pp. 25–29.

McDonald, et al., "Wheat Gliadin in Foams for Food Products", Food Technology (Mar. 1961), pp. 141–144.

Finley, "Deamidated Gluten: A Potential Fortifier for Fruit Juices", Journal of Food Sci nce, vol. 40 (1975), pp. 1283–1285.

Hamada, et al., "Enhancement of Peptidoglutaminase Deamidation of Soy . . . ", Journal of Food Science, vol. 53, No. 4 (1988), pp. 1132–1134.

Hamada, et al., "Preparation and Functional Properties of . . . ", Journal of Food Scienc , vol. 54, No 3 (1989), pp. 598–601.

Wu, et al., "Preparation and Properties of Acid–Solubilized Gluten", J. Agric. Food Chem., vol. 24, No. 3 (1976), pp. 504–510.

(Continued)

*Primary Examiner*—Helen Pratt
(74) *Attorney, Agent, or Firm*—Fitzpatrick, Cella, Harper & Scinto

(57) ABSTRACT

The present invention relates to a method of enhancing the salty taste of a food or beverage containing salt which comprises adding an acidic peptide or a peptide obtained by subjecting a protein to hydrolysis and deamidation to the food or beverage, a salty taste enhancer comprising the peptide as an active ingredient, a salty taste seasoning agent comprising the peptide and salt, and a food or beverage comprising the salty taste enhancer or the salty taste seasoning agent.

42 Claims, No Drawings

OTHER PUBLICATIONS

Kato, et al., "Deamidation of Food Proteins by Protease . . . ", J. Agric. Food Chem., vol. 35, No. 2 (1987), pp. 224–227.

Kato, et al., "Effects of Deamidati n with Chymotrypsin . . . ", J. Agric. Food Chem., vol. 35, No. 2 (1987), pp. 285–288.

Hamada, "Effects of Heat and Proteolysis on Deamidation of Food . . . ", J. Agric. Food Chem., vol. 40, No. 5 (1992), pp. 719–723.

Matsudomi, et al., "Functional Properties of Deamidated Gluten", Nippon Nogeikagaku Kaishi, vol. 55, No. 10 (1981), pp. 983–989 (Abstract).

Matsudomi, et al., "Conformational Changes and Functional Properties of . . . ", Agric. Biol. Chem., vol. 49, No. 5 (1985), pp. 1251–1256.

Matsudomi, et al., "Functional Properties of Deamidated Gluten . . . ", Agric. Biol. Chem., V l. 50, No. 8 (1986), pp. 1989–1994.

Iwami, et al., "Involvement of Post–digestion 'Hydrophobic' Peptides . . . ", Agric. Biol. Ch m., vol. 50, No. 5 (1986), pp. 1217–1222.

Kikuchi, et al., "Peptidoglutaminase, Enzymes for Selective . . . ", Biochemistry, vol. 10, No. 7 (1971), pp. 1222–1229.

Hamada, et al., "Peptidoglutaminase Deamidation of Proteins . . . ", JAOCS, vol. 68, No. 7 (1991), pp. 459–462.

Raymond, et al., "Combined Acid Deamidation and Enzymic . . . ", Journal of Cereal Scienc , vol. 21 (1994), pp. 153–165.

* cited by examiner

METHOD OF ENHANCING SALTY TASTE, SALTY TASTE ENHANCER, SALTY TASTE SEASONING AGENT AND SALTY TASTE-ENHANCED FOODS

TECHNICAL FIELD

The present invention relates to a method of enhancing the salty taste of a food or beverage containing salt, and a salty taste enhancer and a salty taste seasoning agent for use therein. The present invention also relates to a low salt food or beverage which can be obtained by the method.

BACKGROUND ART

Salt (sodium chloride) plays an important role in seasoning and processing of foods and beverages with its activities to give a taste to foods and beverages and to improve the preservability and properties of foods and beverages. In particular, salt gives foods and beverages a taste which makes us feel delicious (a salty taste), and sodium and chlorine, which are the constituents of salt, are essential nutrients for the human body.

However, the excessive intake of sodium, which is a constituent of salt, is considered to be a risk factor which causes lots of health problems such as heart diseases (e.g., hypertension) and vascular diseases. There exists a strong demand, not only in Japan but also in other developed countries, for reduction of the intake of salt, specifically, sodium, with the increase in the number of aged people, who are prone to these diseases.

The simplest way of cutting the salt intake is to reduce the amount of salt to be used in seasoning and processing of foods and beverages. However, when the amount of salt contained in foods and beverages, whether home made ones or processed ones, is reduced by 10% or more, their taste is generally spoiled.

Known methods of reducing the intake of salt, specifically sodium, without spoiling a salty taste, which are generally called methods of salt-cut, include methods in which substances which themselves have a salty taste (hereinafter referred to as salt substitutes) are used and methods in which substances which themselves do not have a salty taste, but enhance a salty taste when used in combination with salt (hereinafter referred to as salty taste enhancing substances) are used.

Examples of the known salt substitutes include potassium salts, ammonium salts, basic amino acids, peptides comprising basic amino acids, and alkali metal salts of gluconic acid.

Potassium salts have the defect that they have not only a salty taste, but also a bitter taste, which leaves a characteristic after taste. For the purpose of solving this problem, the following have been proposed: a composition comprising dihydrochloride of basic amino acid, potassium salt or ammonium salt of glutamic acid and potassium chloride; a mixture of whey mineral and potassium chloride; a composition comprising glycine ethyl ester hydrochloride or tryptophan ethyl ester hydrochloride and potassium chloride; a composition mainly comprising potassium chloride and magnesium salt and further comprising lysine hydrochloride, etc.; and a composition comprising potassium chloride, common salt and citrate, in which the sodium/potassium ratio is 1 or lower.

Examples of the ammonium salts include a composition comprising potassium salt, ammonium salt and acidic choline salt, and a composition comprising common salt and capsuled ammonium salt.

As to the basic amino acids, the following are known: a composition comprising lysine succinate, lysine succinic acid monohydrate or ornithine adipic acid monohydrate; a composition comprising succinate of a basic amino acid; a composition comprising hydrochloride of a basic amino acid, 5'-nucleotide, a sweetening component and sodium citrate; and a composition comprising lysine succinate, etc.

Examples of the peptides comprising basic amino acids include ornithyl-β-alanine, lysyl glycine, ornithyl glycine, ornithyl taurine and lysyl taurine.

An example of the alkali metal salts of gluconic acid is potassium salt of gluconic acid.

The salty taste enhancing substances can not be substituted for salt, but enable salt-cut by enhancing the salty taste of salt to reduce the amount of salt to be used.

Examples of the known salty taste enhancing substances are as follows: peptides obtained by hydrolyzing collagen having a molecular weight of 50,000 dalton or less (Japanese Published Unexamined Patent Application No. 3766/88); thaumatin, which is a sweetening protein (Japanese Published Unexamined Patent Application No. 137658/88); a degradation solution obtained by digestion of a mixture of black koji produced with *Aspergillus niger* having citric acid-producing ability and yellow koji produced with *Aspergillus oryzae* (Japanese Published Unexamined Patent Application No. 53456/90); cetyl pyridinium salt, which is a cationic surfactant, alone or a mixture of cetyl pyridinium salt and a basic amino acid such as arginine or lysine (PCT National Publication No. 502517/91); saturated aliphatic monocarboxylic acids having 3–8 carbon atoms (Japanese Published Unexamined Patent Application No. 184326/93); an equimolar mixture of arginine, which is a basic amino acid, and aspartic acid, which is an acidic amino acid (U.S. Pat. No. 5,145,707); hydrolyzates of proteins such as egg white protein, gelatin, soybean protein, wheat protein, corn protein, fish protein, milk protein and meat protein (Japanese Published Unexamined Patent Application No. 289197/95); and trehalose (Japanese Published Unexamined Patent Application No. 66540/98).

It is described that enzymatic degradation products of proteins have salty taste enhancing activity in the above Japanese Published Unexamined Patent Application No. 3766/88 and Japanese Published Unexamined Patent Application No. 289197/95. In Japanese Published Unexamined Patent Application No. 3766/88, it is described that collagen hydrolyzate has salty taste enhancing activity, but this activity is characteristic of collagen hydrolyzate and is not observed with soybean protein hydrolyzate or milk protein hydrolyzate.

The above Japanese Published Unexamined Patent Application No. 289197/95 discloses the use of protein hydrolyzates as salty taste enhancing substances. However, it is also described that the active ingredient having the salty taste enhancing activity of the disclosed invention is free basic amino acids such as arginine and lysine formed by hydrolysis of proteins.

As described above, a number of methods using salt substitutes or salty taste enhancing substances have been proposed as salt cutting methods. However, none of the methods of salt-cut so far developed is satisfactory in respect of taste, effect, economy, safety, or the like, and low salt foods are not generally available. There exists a strong demand for a method of salt-cut overcoming the above problems.

Numbers of studies have been made on the taste of peptides. Dipeptides and tripeptides containing glutamic acid or aspartic acid have been isolated as peptides having umami from a plastein reaction product obtained by treating a pepsin degradation product of soybean protein isolate with chymotrypsin [Agr. Biol. Chem., 36, 1253 (1972)]. The result has been confirmed using synthetic peptides [Agr. Biol. Chem., 37, 151 (1973)]. Peptides having a molecular weight of 1,000 or less have been obtained by fractionation of an enzymatic degradation product of fish meat protein concentrate, and then further fractionated into acidic peptides, neutral peptides and basic peptides using an ion exchange resin, and it has been revealed that the acidic oligopeptide fraction has umami [Agr. Biol. Chem., 37, 2891 (1973)]. Further, the constituent peptides of the acidic oligopeptide fraction have been identified [J. Agric. Food. Chem., 23, 49 (1975)].

There are some reports that acidic peptides of low molecular weight have a salty taste. Delicious peptide is an umami peptide consisting of 8 amino acids which has been found in a beef soup. In the course of the research on the structure-activity relationship of the peptide, it has been found that basic dipeptides and acidic dipeptides have a salty taste [Agr. Biol. Chem., 53, 319 (1989)]. It has also been revealed, with regard to these acidic peptides and similar acidic peptides, that 4 kinds of dipeptides and 8 kinds of tripeptides consisting of aspartic acid and/or glutamic acid have a salty taste as well as umami, and further an acidic peptide consisting of 5 amino acids which is a constitutive partial peptide of the delicious peptide has been reported to have a salty taste [Biosci. Biotech. Biochem., 59, 689 (1995)].

There is also a report that peptides in an enzymatic degradation product of a protein have a salty taste. It is reported that a fraction of 500–1000 molecular weight obtained by treating gluten, which is wheat protein, with actinase, which is a proteolytic enzyme, and then deamidating the degradation product with hydrochloric acid, followed by fractionation, has a salty taste as well as a sweet taste, a sour taste, a bitter taste, an astringent taste and umami. However, it is reported that the addition of this fraction to soup stock made from boiled and dried sardines significantly strengthens umami alone, but does not bring about a significant difference with respect to the other tastes such as sweet taste and salty taste [Journal of Home Economics of Japan, 45, 615 (1994)].

Acidic peptides have been isolated from an enzymatic degradation product of soybean protein as umami peptides, and some of them have been reported to exhibit a salty taste by themselves or in the presence of inosinic acid [Biosci. Biotech. Biochem., 63, 555 (1999)].

There is also a report that acidic peptides mask the bitter taste of peptides [J. Food Sci., 40, 367 (1975)].

As stated above, lots of researches have been made on peptides, specifically acidic peptides, in respect of their own tastes and their effects on other tastes such as umami and bitter taste. They have revealed that peptides have umami, a salty taste, etc. and mask a bitter taste. However, it is not known that an enzymatic degradation product of a protein which mainly comprises peptides obtained by subjecting the protein to hydrolysis and/or deamidation enhances the salty taste of salt. In connection with the salty taste enhancing activity of a peptide having a salty taste, the strength of the salty taste of a solution of salt and ornithyl-β-alanine was evaluated, and it was confirmed that the salty taste of each solute independently appeared and the strength of the salty taste of the solution was merely additive, but not synergistic. That is, it has been revealed that ornithyl-β-alanine does not have the activity to enhance the salty taste of salt [J. Agric. Food. Chem., 38, 25 (1990)].

As described above, it has not been known yet that acidic peptides have salty taste enhancing activity. Additionally, commercially available enzymatic hydrolyzates such as seasonings and nutritious food materials obtained by enzymatic degradation of proteins do not have salty taste enhancing activity.

DISCLOSURE OF THE INVENTION

An object of the present invention is to provide a method of enhancing the salty taste of a food or beverage containing salt, and a salty taste enhancer and a salty taste seasoning agent for use therein. Another object of the present invention is to provide a low salt food or beverage which can be obtained by the method.

The present inventors have discovered that an acidic peptide or a peptide obtained by subjecting protein to hydrolysis and deamidation, which itself does not have a salty taste, has the activity to enhance the salty taste of salt (hereinafter referred to as salty taste enhancing activity) and have completed the present invention.

The present invention relates to the following (1) to (42).

(1) A method of enhancing the salty taste of a food or beverage containing salt, which comprises adding an acidic peptide to the food or beverage.
(2) The method according to (1), wherein the acidic peptide is an acidic peptide which is obtainable by subjecting a protein to hydrolysis.
(3) The method according to (1), wherein the acidic peptide is an acidic peptide which is obtainable by subjecting a protein to hydrolysis and deamidation.
(4) The method according to any of (1) to (3), which further comprises adding a basic substance.
(5) The method according to (4), wherein the basic substance is a basic amino acid.
(6) The method according to (5), wherein the basic amino acid is arginine.
(7) The method according to any of (1) to (6), which further comprises adding succinic acid.
(8) A salty taste enhancer comprising an acidic peptide as an active ingredient.
(9) The salty taste enhancer according to (8), wherein the acidic peptide is an acidic peptide which is obtainable by subjecting a protein to hydrolysis.
(10) The salty taste enhancer according to (8), wherein the acidic peptide is an acidic peptide which is obtainable by subjecting a protein to hydrolysis and deamidation.
(11) The salty taste enhancer according to any of (8) to (10), further comprising a basic substance.
(12) The salty taste enhancer according to (11), wherein the basic substance is a basic amino acid.
(13) The salty taste enhancer according to (12), wherein the basic amino acid is arginine.
(14) The salty taste enhancer according to any of (8) to (13), further comprising succinic acid.
(15) A salty taste seasoning agent comprising an acidic peptide and salt.
(16) The salty taste seasoning agent according to (15), wherein the acidic peptide is an acidic peptide which is obtainable by subjecting a protein to hydrolysis.
(17) The salty taste seasoning agent according to (15), wherein the acidic peptide is an acidic peptide which is obtainable by subjecting a protein to hydrolysis and deamidation.

(18) The salty taste seasoning agent according to any of (15) to (17), further comprising a basic substance.
(19) The salty taste seasoning agent according to (18), wherein the basic substance is a basic amino acid.
(20) The salty taste seasoning agent according to (19), wherein the basic amino acid is arginine.
(21) The salty taste seasoning agent according to any of (15) to (20), further comprising succinic acid.
(22) A food or beverage comprising the salty taste enhancer according to any of (8) to (14).
(23) A food or beverage comprising salt and the salty taste enhancer according to any of (8) to (14).
(24) A food or beverage comprising the salty taste seasoning agent according to any of (15) to (21).
(25) A method of enhancing the salty taste of a food or beverage containing salt, which comprises adding to the food or beverage a peptide which is obtainable by subjecting a protein to hydrolysis and deamidation.
(26) The method according to (25), which further comprises adding a basic substance.
(27) The method according to (26), wherein the basic substance is a basic amino acid.
(28) The method according to (27), wherein the basic amino acid is arginine.
(29) The method according to any of (25) to (28), which further comprises adding succinic acid.
(30) A salty taste enhancer comprising, as an active ingredient, a peptide which is obtainable by subjecting a protein to hydrolysis and deamidation.
(31) The salty taste enhancer according to (30), further comprising a basic substance.
(32) The salty taste enhancer according to (31), wherein the basic substance is a basic amino acid.
(33) The salty taste enhancer according to (32), wherein the basic amino acid is arginine.
(34) The salty taste enhancer according to any of (30) to (33), further comprising succinic acid.
(35) A salty taste seasoning agent comprising a peptide which is obtainable by subjecting a protein to hydrolysis and deamidation and salt.
(36) The salty taste seasoning agent according to (35), further comprising a basic substance.
(37) The salty taste seasoning agent according to (36), wherein the basic substance is a basic amino acid.
(38) The salty taste seasoning agent according to (37), wherein the basic amino acid is arginine.
(39) The salty taste seasoning agent according to any of (35) to (38), further comprising succinic acid.
(40) A food or beverage comprising the salty taste enhancer according to any of (30) to (34).
(41) A food or beverage comprising salt and the salty taste enhancer according to any of (30) to (34).
(42) A food or beverage comprising the salty taste seasoning agent according to any of (35) to (39).

The term acidic peptide as used herein refers to peptides wherein the number of acidic amino acids in the constituent amino acids is larger than that of basic amino acids. "Acidic amino acids" means aspartic acid and glutamic acid, and "basic amino acids" means lysine, arginine and histidine.

The proportion of acidic amino acids based on the total amino acids in the acidic peptides useful in the present invention is preferably 20% or more, more preferably 30% or more. When the proportion of acidic amino acids based on the total amino acids is 20% or more, that of basic amino acids is preferably 15% or less, more preferably 10% or less, most preferably 5% or less. When the proportion of acidic amino acids based on the total amino acids is 30% or more, that of basic amino acids is preferably 20% or less, more preferably 15% or less, most preferably 10% or less.

The molecular weight of the acidic peptides is preferably 400 to 30,000, more preferably 500 to 30,000, most preferably 700 to 27,000. The peptide chain length is preferably 3 to 250, more preferably 4 to 250, most preferably 6 to 230.

The acidic peptides can be obtained by the peptide synthesis method or usually by subjecting proteins to hydrolysis using endopeptidase, etc. and if necessary, to deamidation.

When the number of acidic amino acids in the constituent amino acids of a protein to be hydrolyzed is larger than that of basic amino acids, acidic peptides can be obtained by subjecting the protein to hydrolysis. Further, deamidation of the protein produces more acidic peptides because the asparagine residues and the glutamine residues in the protein are converted into the aspartic acid residues and the glutamic acid residues, respectively.

When the total number of acidic amino acids and amides in the constituent amino acids of a protein to be hydrolyzed is larger than that of basic amino acids, acidic peptides can be obtained by subjecting the protein to deamidation, in addition to hydrolysis.

When acidic peptides are formed by hydrolysis of a protein wherein the number of acidic amino acids or the total number of acidic amino acids and amides is smaller than that of basic amino acids, the formed acidic peptides can be used as the acidic peptides of the present invention.

As the protein to be subjected to hydrolysis and deamidation according to the present invention, any proteins that have amides in the amino acid composition can be used. Preferred are proteins wherein the number of acidic amino acids is larger than that of basic amino acids in the amino acid composition. More preferred are proteins wherein the total number of acidic amino acids and amides is larger than that of basic amino acids in the amino acid composition. The total number of acidic amino acids and amides is preferably 10% or more, more preferably 20% or more, most preferably 30% or more, of the number of the total amino acids.

The term amide as used herein refers to asparagine and glutamine. Asparagine and glutamine are respectively converted into aspartic acid and glutamic acid by deamidation.

The proteins suitable for use in the production of the acidic peptides or the peptides obtained by subjecting a protein to hydrolysis and deamidation according to the present invention include plant proteins, for example, wheat gluten (sometimes referred to merely as gluten), corn protein (e.g., zein and gluten meal) and soybean protein isolate (sometimes referred to merely as soybean protein); animal proteins, for example, milk proteins such as milk casein (sometimes referred to merely as casein) and milk whey protein, muscle proteins such as meat protein and fish meat protein, egg white protein and collagen; and microbial proteins, for example, microbial cell protein and polypeptides produced by microorganisms.

Examples of the proteins wherein the number of acidic amino acids is larger than that of basic amino acids in the amino acid composition are soybean protein, milk protein, meat protein, fish meat protein and egg white protein. An example of the proteins wherein the total number of acidic amino acids and amides is larger than that of basic amino acids in the amino acid composition is wheat gluten.

Examples of the proteins wherein the total number of acidic amino acids and amides is 30% or more of the number of the total amino acids are wheat gluten and soybean protein isolate. Examples of the proteins wherein the total number of acidic amino acids and amides is 20% or more but less than 30% of the number of the total amino acids are milk casein, milk whey protein, meat protein, fish meat protein, egg white protein and corn protein. An example of the proteins wherein the total number of acidic amino acids and amides is 10% or more but less than 20% of the number of the total amino acids is collagen.

Gelatin obtained from collagen can also be used as the protein of the present invention. Gelatin is classified into two kinds: gelatin obtained by acid treatment (type A) and gelatin obtained by alkali treatment (type B). Both kinds of gelatins can be used, and gelatin of type B, in which most of the amide bonds are broken, may be used without deamidation.

Hydrolysis of protein can be carried out according to chemical treatment utilizing acid, alkali, etc. and enzymatic treatment using proteolytic enzymes. Enzymatic treatment is advantageously employed.

The proteolytic enzymes include endopeptidase (also referred to as proteinase) and exopeptidase. Preferred is endopeptidase.

Examples of the endopeptidases are serine proteases such as trypsin, chymotrypsin and subtilisin, thiol proteases such as papain, bromelain and ficin, carboxyl proteases such as pepsin and chymosin, and metal proteases such as thermolysin.

Examples of the commercially available endopepdidases are pepsin, Multifect P-3000 (Kyowa Enzyme Co., Ltd.), Bioprase (Nagase & Co., Ltd.) and Alkalase (Novo Nordisk A/S).

When endopeptidase having exopeptidase activity is used as the proteolytic enzyme, the exopeptidase activity forms umami derived from free amino acids and low molecular peptides and reduces a bitter taste, which sometimes gives a preferable result.

Examples of the enzymes having exopeptidase activity are Sumizyme FP (Shin Nihon Chemical Co., Ltd.) and Actinase (Kaken Pharmaceutical Co., Ltd.).

The amount of proteolytic enzyme to be used varies depending upon the kind of enzyme and protein to be employed, but it is preferably 0.05 to 8% (w/w), more preferably 0.1 to 6% (w/w), and most preferably 1 to 4% (w/w) based on the amount of protein subjected to hydrolysis.

The conditions for hydrolysis of protein such as the pH and the reaction temperature may be the optimum conditions for the enzyme to be used or conditions closer thereto. The reaction conditions can finally be decided considering the salty taste enhancing activity and the taste of a hydrolyzate to be obtained. The information about proteolytic enzymes such as the amount to be used, the reaction pH, the reaction temperature and the stability is available from enzyme suppliers.

The pH adjustment can be carried out using any appropriate acids applicable to foods and beverages such as hydrochloric acid, acetic acid, lactic acid, citric acid and phosphoric acid, or any appropriate alkalis applicable to foods and beverages such as sodium hydroxide and potassium hydroxide. The time for hydrolysis of protein varies depending upon the kind of proteolytic enzyme to be used, the amount thereof, the temperature, the pH, etc., but it is preferably 1 to 100 hours, more preferably 6 to 72 hours.

After the completion of hydrolysis, the reaction mixture can be subjected to the subsequent treatment as such or after inactivation of the enzyme by heating or acid treatment.

The process of deamidation is described below.

Deamidation can be carried out by the chemical method and the enzymatic method. Deamidation reaction may be carried out either before or after the above-mentioned protein hydrolysis. It may also be carried out simultaneously with the hydrolysis.

The chemical deamidation can be carried out according to known methods, generally by heating a protein with an acid. Examples of the acids include inorganic acids such as hydrochloric acid and sulfuric acid, and organic acids such as acetic acid and lactic acid. When a high amidation rate is desired, hydrochloric acid is preferably used. Deamidation reaction using hydrochloric acid can be carried out, for example, at a hydrochloric acid concentration of 0.4 to 1.0 mol/l at 50 to 125° C. for 10 to 180 minutes.

Specifically, the chemical deamidation can be carried out according to the procedures described, for example, in Food Technol., 15(3), 141 (1961), J. Food Sci., 40, 1283 (1975), J. Agric. Food Chem., 24, 504 (1974), Nippon Nogeikagaku Kaishi, 55, 983 (1981) and Agric., Biol. Chem., 49, 1251 (1985).

When the deamidation reaction is carried out with acids, it is necessary to carry out neutralization by using a neutralizer or the like after the completion of the reaction. As the neutralizer, sodium hydroxide is generally employed. However, when it is desired to obtain a salty taste enhancer containing no sodium, other alkali agents employed in processing of foods or beverages such as potassium hydroxide should be used. Free basic substances can also be used for neutralization alone or in combination with other neutralizers. Examples of the free basic substances include basic amino acids such as arginine and lysine.

The enzymatic deamidation reaction can be carried out according to known methods.

The first applicable method is a method by hydrolysis using endopeptidase. In this reaction, breaking of the peptide bonds and deamidation proceed simultaneously. Enzymes useful in the reaction include papain, trypsin, pancreatin, Alkalase (Novo Nordisk A/S) and Pronase (Kaken Pharmaceutical Co., Ltd.). The reaction is carried out usually at pH 8 to 11, at 10 to 75° C. for 6 to 48 hours.

Specifically, the reaction can be carried out according to the procedures described, for example, in Agric. Biol. Chem., 50, 1989 (1986), J. Agric. Food Chem., 35, 224 (1987), J. Agric. Food Chem., 35, 285 (1987), J. Food Sci., 55, 127 (1990) and Japanese Published Unexamined Patent Application No. 91445/91.

The second enzymatic method is a method using peptide glutaminase which hydrolyzes the amide bond of glutamine in peptides [Biochemistry, 10, 1222 (1971)]. A high deamidation rate is obtained by this method. The treatment with peptide glutaminase is preferably carried out after a protein is heated or hydrolyzed with an enzyme to enhance the efficiency [J. Food Sci., 53, 1132 (1988), J. Food Sci., 54, 598 (1989), JAOCS, 68, 459 (1991) and J. Agric. Food Chem., 40, 719 (1992)].

The molecular weight of the peptides obtained by subjecting a protein to hydrolysis and deamidation is preferably 400 to 30,000, more preferably 500 to 30,000, most preferably 700 to 27,000. The peptide chain length is preferably 3 to 250, more preferably 4 to 250, most preferably 6 to 230.

Deamidation of protein and hydrolysis subsequent thereto, or hydrolysis of protein and deamidation subsequent thereto can also be carried out according to the methods described in the literature [J. Cereal Sci., 21, 153 (1994) and Journal of Home Economics of Japan, 45, 615 (1994)]. The deamidation rate required for obtaining the protein hydrolyzate having salty taste enhancing activity of the present invention varies depending upon the content of acidic amino acids and amides in the protein, but it is preferably 20% or more, more preferably 50% or more, most preferably 80% or more.

A solution obtained by subjecting a protein to hydrolysis, and if necessary to deamidation may be added to foods or beverages, or used as the salty taste enhancer or the salty taste seasoning agent as such. The solution may also be used in the form of liquids such as a decolored solution, a purified solution and a concentrated solution which are obtained by decolorization using activated carbon or a ultrafiltration membrane, separation and purification by chromatography or membrane separation, and concentration under reduced pressure, or in the form of solids and powders which are obtained by subjecting the obtained liquids to drying under reduced pressure or spray-drying.

Basic substances further strengthen the salty taste enhancing activity of the peptides obtained by subjecting a protein to hydrolysis and if necessary, to deamidation. There is no specific restriction as to the basic substances to be used, so long as they can be added to foods and beverages and can strengthen the salty taste enhancing activity of the peptides. For example, basic amino acids can be used.

Examples of the basic amino acids include arginine, lysine and ornithine, and arginine is specifically preferred. The basic substance is used in such an amount that its concentration in a food becomes 3 to 50 mmol/kg, preferably 8 to 25 mmol/kg. In the case of arginine, the concentration is 0.04 to 0.9%, preferably 0.15 to 0.4%.

The salty taste enhancing activity of the peptides of the present invention is also reinforced with succinic acid. Succinic acid is known to have a taste peculiar to shellfish. Succinic acid exhibits its effect even at a concentration below 0.02% which is the threshold of perception of its characteristic taste. Succinic acid is used in the form of free acid or salt in such an amount that its concentration in a food becomes 0.001 to 0.1%, preferably 0.005 to 0.03%.

The method of enhancing a salty taste of the present invention is applicable to any foods or beverages, whether originally containing salt or not, so long as they contain salt at the time of eating or drinking. Examples of the foods or beverages include seasonings such as miso, soy sauce, sauce, soup stock, dressing, mayonnaise and tomato ketchup, soups such as Japanese clear soup, consomme soup, egg soup, seaweed soup, shark fin soup, potage and miso soup, soups and sauces for noodles (e.g., buckwheat noodle, Japanese noodle, Chinese noodle and pasta), cooked rice such as rice gruel, porridge of rice and vegetables, and boiled rice-in-tea, processed livestock products such as ham, sausage and cheese, processed marine products such as steamed fish paste, dried fish, salted fish guts and chinmi, processed vegetable products such as pickles, snacks such as potato chips, rice crackers and cookies, and cooked foods such as boiled foods, fried foods, grilled foods and curry.

The salty taste enhancer of the present invention contains the acidic peptides or the peptides obtained by subjecting a protein to hydrolysis and deamidation, and if necessary, the basic substance and/or succinic acid, and may further contain various additives applicable to foods or beverages such as inorganic salts, acids, amino acids, nucleic acids, sugars and excipients.

The salty taste seasoning agent of the present invention contains salt and the acidic peptides or the peptides obtained by subjecting a protein to hydrolysis and deamidation, and if necessary, the basic substance and/or succinic acid, and may further contain various additives applicable to foods or beverages such as seasonings, spices, inorganic salts, acids, amino acids, nucleic acids, sugars and excipients.

Examples of the inorganic salts include sodium chloride, potassium chloride and ammonium chloride. Examples of the acids include carboxylic acids such as ascorbic acid, fumaric acid, malic acid, tartaric acid, citric acid and fatty acid, and salts thereof. Examples of the above salts include sodium salt and potassium salt. Examples of the amino acids include sodium glutamate and glycine. Examples of the nucleic acids include sodium inosinate and sodium guanylate. Examples of the sugars include sucrose, glucose and lactose. Examples of the seasonings include natural seasonings such as soy sauce, miso and extracts. Various spices can be used as the spice. Examples of the excipients include dextrin, which is a starch hydrolyzate, and various starches. The amount of these additives may be appropriately decided according to the purpose of use, and it is, for example, 0.1 to 500 parts by weight for 100 parts by weight of the peptides.

The term "low salt food or beverage" as used herein refers to a food or beverage having a lower salt concentration than usual, which is generally 80% (w/w) or less of an ordinary salt concentration. The ordinary salt concentration varies depending upon the kind of foods or beverages and the product, but there is no specific restriction as to the salt concentration of foods or beverages to which the present invention is applied.

The salty taste enhancer and the salty taste seasoning agent are added to a food or beverage in an amount of 0.01 to 1.5% (w/w), preferably 0.1 to 0.8% (w/w), in terms of the amount of acidic peptides, based on the amount of the food or beverage. In the case of the peptide mixture obtained by subjecting a protein to hydrolysis, the amount of the peptides to be added to a food or beverage is usually 0.02 to 2.0% (w/w), preferably 0.2 to 1.0% (w/w), which may vary depending upon the kind of protein used as a material. When the salty taste enhancer contains salt and its content is too high, the enhancer is used after the salt content is lowered by desalting. Desalting can be carried out by electrodialysis and reverse osmosis.

The analytical methods used in the present invention are described below.

1. Method of Determination of Proteins and Peptides

The amounts of proteins and peptides in a hydrolyzate were calculated from the amount of total nitrogen (T-N). Determination of total nitrogen was carried out by the Kjeldahl method or Dumas' method. In the calculation of average peptide chain length, the amount of nitrogen was calculated by subtracting the amount of ammonia measured according to the following method from the amount of total nitrogen. The amounts of proteins and peptides were calculated by multiplying the amount of total nitrogen by the conversion factor. The conversion factors used were 5.7 for gluten and 6.25 for the other proteins.

2. Method of Determination of Amino Nitrogen

Determination of amino nitrogen was carried out according to the colorimetric method using trinitrobenzenesulfonic acid as a coloring reagent [Agric. Biol. Chem., 50, 1217 (1986)]. Deproteinization using trichloroacetic acid was omitted in order to determine high molecular peptides as well as low molecular peptides. Leucine was used as a standard substance. As an ammonium ion also develops a color by reaction with trinitrobenzenesulfonic acid, the concentration of amino nitrogen was calculated by subtracting the absorbance of the ammonium ion calculated based on the absorbance of a standard solution of ammonium sulfate and the ammonium ion concentration in a sample.

3. Method of Determination of Ammonia

Determination of ammonia was carried out according to an enzymatic method using Determiner $NH_3$ (Kyowa Medex Co., Ltd.).

4. Average Peptide Length

The average peptide length was obtained by dividing the amount of total nitrogen in a hydrolyzate by the amount of amino nitrogen.

5. Deamidation Rate

The deamidation rate (%) of the amide bonds in a protein was expressed as the rate of ammonia nitrogen formed by deamidation reaction based on amide nitrogen in the protein. The amount of amide nitrogen in the protein was calculated by accurately weighing about 1 g of protein, heating the weighed protein in 50 ml of 2 mol/l hydrochloric acid at 120° C. for 30 minutes, and then measuring the formed ammonia.

6. Amino Acid Analysis

Free amino acids were analyzed as such, and the amino acid composition of a protein and the peptides in a hydrolyzate thereof was analyzed after degradation with hydrochloric acid by using an amino acid autoanalyzer.

7. Fractionation of Acidic Peptides

An acidic peptide fraction was obtained from a peptide mixture by ion exchange chromatography using SP-Sepharose Fast Flow (Pharmacia Biotech) as an ion exchanger.

8. Method of Measuring the Salt Concentration

The salt concentration was obtained by calculating the sodium concentration in an enzymatic hydrolyzate from the amount of sodium hydroxide used in enzymatic hydrolysis and deamidation and the amount of sodium derived from a starting material (the calculative method). The salt concentration was also measured by using a sodium ion selective electrode (Mettler Toledo)(the electrode method). The both methods gave almost the same measurement results.

9. Method of Evaluation of Salt Taste Enhancing Activity 1

The salty taste of a test solution having the salt concentration adjusted to 0.100 mol/l was compared with those of standard salt solutions having concentrations of 0.100 mol/l (0.58% (w/v)), 0.125 mol/l (0.73% (w/v)), 0.150 mol/l (0.88% (w/v)) and 0.175 mol/l (1.02% (w/v)), respectively, to find the same or close level of salty taste in the standard salt solutions. Evaluation of salty taste enhancing activity was made on salty taste enhancing substances according to the grading shown in Table 1 by a panel of experts in tasting of foods or beverages.

TABLE 1

| Salty taste of test solution | Grade |
|---|---|
| Equal or close to 0.100 mol/l salt solution | 0 |
| Equal or close to the middle between 0.100 mol/l salt solution and 0.125 mol/l salt solution | 1 |
| Equal or close to 0.125 mol/l salt solution | 2 |
| Equal or close to the middle between 0.125 mol/l salt solution and 0.150 mol/l salt solution | 3 |
| Equal or close to 0.150 mol/l salt solution | 4 |
| Equal or close to the middle between 0.150 mol/l salt solution and 0.175 mol/l salt solution | 5 |
| Equal or close to 0.175 mol/l salt solution | 6 |

10. Method of Evaluation of Salty Taste Enhancing Activity 2 (the Constant Stimulation Method)

A peptide solution having the salt concentration adjusted to 0.10 mol/l was used as a test solution. Standard salt solutions having concentrations of 0.08 mol/l, 0.09 mol/l, 0.10 mol/l, 0.11 mol/l, 0.12 mol/l, 0.13 mol/l, 0.14 mol/l, 0.15 mol/l and 0.16 mol/l were prepared. From the standard salt solutions were selected 5 consecutive grades of standard solutions so that the strength of the salty taste of the test solution is in about the middle. The salty taste of the selected standard solutions was compared with that of the test solution (constant stimulation) and the comparison results were expressed by a sign of equality or inequality. For each standard salt concentration, the rate of the panel members who judged the salty taste of a standard solution to be stronger based on the whole panel (hereinafter referred to as the judgment appearance rate, rate A) and the rate of the panel members who judged the salty taste of a standard solution to be weaker based on the whole panel (rate B) were calculated. These values were plotted on a normal probability paper against the standard salt concentration (the strength of the constant stimulation) as abscissa to draw a straight line for each of rate A and rate B. The value at the middle between the two concentrations on the two straight lines corresponding to the 50% judgment appearance rate was regarded as the equivalent salt concentration of the test solution. The equivalent concentration is obtained as a concentration at the point of intersection of the two straight lines or a point close thereto (Makoto Sato, Method of Statistical Sensory Evaluation, 2nd ed., p. 304, JUSE Press, 1995). The panel consisted of 12–15 experts in tasting of foods or beverages.

Examples of the present invention are shown below.

BEST MODES FOR CARRYING OUT THE INVENTION

Example 1

Wheat gluten powder (134 g, T-N: 118 mg/g, amide nitrogen: 1.88 mmol/g, Weston Foods) was dispersed in 866 ml of 0.6 mol/l hydrochloric acid, and the obtained dispersion was heated in an autoclave at 120° C. for 2 hours to obtain 910 ml of a deamidated gluten dispersion. After the dispersion was adjusted to pH 8.0 with 2 mol/l sodium hydroxide, 6 ml of a proteolytic enzyme (Multifect P-3000, Kyowa Enzyme Co., Ltd.) was added thereto and hydrolysis was carried out at 40° C. for 20 hours. During the reaction, the pH was adjusted to 8.0 with 2 mol/l sodium hydroxide. After the completion of the reaction, 2 mol/l hydrochloric acid was added to the hydrolyzate to adjust the pH to 6.0, followed by heating at 80° C. for 20 minutes to inactivate the enzyme. To the resulting mixture was added 10 g of activated carbon for decolorization, followed by filtration to obtain 1,200 ml of a gluten degradation solution having salty taste enhancing activity which comprises, as an active ingredient, peptides obtained by subjecting wheat gluten to hydrolysis and deamidation. The degradation solution had the nitrogen concentration of 12.8 g/l and the salt concentration of 0.505 mol/l.

A test solution having the composition shown in Table 2 was prepared using the obtained degradation solution. The peptide concentration in the test solution was adjusted to one tenth of that in the degradation solution, and the salt concentration in the test solution was adjusted to 0.1 mol/l.

TABLE 2

| Degradation solution (ml) | 1 mol/l NaCl (ml) | Water (ml) | Total (ml) |
|---|---|---|---|
| 100 | 50 | 850 | 1000 |

The salty taste enhancing activity of the test solution was evaluated according to the method of evaluation of salty taste enhancing activity 1. The test solution was found to have the salty taste almost equal to that of a 0.125 mol/l salt solution and thus was graded 2.

The salty taste enhancing activity of the test solution was also evaluated according to the method of evaluation of salty taste enhancing activity 2, and it was found that the equivalent salt concentration was 0.129 mol/l.

Similar evaluation was made on an equimolar mixture of arginine and aspartic acid which had been relatively highly evaluated in the prior art in respect of salty taste enhancing activity and quality of taste (U.S. Pat. No. 5,145,707). An aqueous solution comprising 0.1 mol/l salt, 0.02 mol/l arginine and 0.02 mol/l aspartic acid was prepared and evaluated, and its equivalent salt concentration was found to be 0.125 mol/l. Rise in the concentrations of arginine and aspartic acid did not cause the increase in the equivalent salt concentration. The equivalent salt concentrations of an aqueous solution comprising 0.02 mol/l arginine (hydrochloride) and 0.1 mol/l salt and an aqueous solution comprising 0.02 mol/l aspartic acid (sodium salt) and 0.1 mol/l salt were 0.116 mol/l and 0.111 mol/l, respectively.

The concentrations of arginine, lysine and aspartic acid in the test solution were 0.012 g/l, 0.007 g/l and 0.148 g/l, respectively. Accordingly, an aqueous solution comprising 0.1 mol/l salt, 0.012 g/l arginine, 0.007 g/l lysine and 0.148 g/l aspartic acid was prepared and evaluated, and its equivalent salt concentration was found to be 0.100 mol/l.

Example 2

Wheat gluten powder (134 g) was subjected to deamidation in the same manner as in Example 1 to obtain 910 ml of a deamidated gluten dispersion. To the obtained dispersion was added 42 g of arginine, and the resulting mixture was adjusted to pH 8.0 with 2 mol/l sodium hydroxide. Subsequently, the mixture was treated in the same manner as in Example 1 to obtain 1,100 ml of a gluten degradation solution having salty taste enhancing activity which comprises, as active ingredients, peptides obtained by subjecting a protein to deamidation and enzymatic degradation and arginine. The salt concentration in the degradation solution was 0.351 mol/l. As a result of the analysis of free amino acids in the degradation solution, it was found that the arginine concentration was 34.2 g/l and the amount of nitrogen excluding arginine was 14.0 g/l.

A test solution having the composition shown in Table 3 was prepared using the obtained degradation solution. The peptide concentration in the test solution was adjusted to one tenth of that in the degradation solution, and the salt concentration in the test solution was adjusted to 0.1 mol/l.

TABLE 3

| Degradation solution (ml) | 1 mol/l NaCl (ml) | Water (ml) | Total (ml) |
| --- | --- | --- | --- |
| 100 | 65 | 835 | 1000 |

The salty taste enhancing activity of the test solution was evaluated according to the method of evaluation of salty taste enhancing activity 1. The 10-fold diluted solution was found to have the salty taste almost equal to that of a 0.15 mol/l salt solution and thus was graded 4. Evaluation was also made according to the method of evaluation 2, and it was found that the equivalent salt concentration of the test solution was 0.149 mol/l.

The salty taste enhancing activity was almost doubled by combining the above degradation solution with arginine (as the degradation solution alone enhanced the salty taste of 0.1 mol/l salt to the level of 0.125 mol/l salt, comparison was made based on the 0.025 mol/l difference).

The arginine concentration in an aqueous solution comprising 0.1 mol/l salt, 0.02 mol/l arginine and 0.02 mol/l aspartic acid which has an equivalent salt concentration of 0.125 mol/l was 3.48 g/l, which is almost the same as the arginine concentration in the above test solution (3.42 g/l). It indicates that the peptides obtained by subjecting wheat gluten to hydrolysis and deamidation in the test solution are far superior to aspartic acid in the exhibition of salty taste enhancing activity in combination with arginine.

Example 3

A soybean protein isolate (50 g, T-N: 132 mg/g, amide nitrogen: 0.958 mmol/g, Fuji Oil Co., Ltd.) was dispersed in 450 ml of water, and 1 ml of alkalase was added thereto at 50° C. The resulting dispersion was subjected to reaction for 30 minutes without adjusting pH. Then, the pH of the dispersion was raised to 8 with 6 mol/l sodium hydroxide, followed by reaction at 50° C. for 21 hours. During the reaction, the pH of the dispersion was maintained at 8. After the completion of the reaction, the dispersion was adjusted to pH 6.0 with 6 mol/l hydrochloric acid and then heated at 85 to 90° C. for 20 minutes to inactivate the enzyme, followed by centrifugation and filtration to obtain 445 ml of a clear degradation solution. The concentration of the total nitrogen was 13.10 g/l and the salt concentration was 0.177 mol/l. The concentration of free arginine was not more than 0.01 g/l. The deamidation rate was 20%. Evaluation of salty taste enhancing activity was made on the 10-fold diluted degradation solution according to the method of evaluation 1. As a result, the grade was 1 in the absence of arginine and was 2 in the presence of 0.012 mol/l arginine.

Example 4

To 3,460 ml of warm water of 55° C. containing 8 ml of alkalase was slowly added 532 g of gluten, and the resulting mixture was subjected to reaction at 55° C. for 24 hours, during which the pH was adjusted to 7.0 with 6 mol/l sodium hydroxide. To 3,800 ml of the obtained enzymatic degradation solution (total amount obtained: 3,848 ml) was added 226 ml of concentrated hydrochloric acid, and the resulting mixture was heated at 115° C. for 90 minutes for deamidation. The treated solution (3,940 ml) was divided into 2 equal portions. To one portion was added 218 ml of 6 mol/l sodium hydroxide and to the other portion were added 135 ml of 6 mol/l sodium hydroxide and 85.5 g of arginine to obtain neutralized solutions. To each of the neutralized solutions was added 34 g of activated carbon for decolorization, followed by concentration to obtain 1,600 ml of a peptide solution having salty taste enhancing activity. The peptide solution containing no arginine (sample 1) had the peptide concentration of 94.6 g/l and the salt concentration of 0.92 mol/l. The peptide solution containing arginine (sample 2) had the peptide concentration of 94.6 g/l, the salt concentration of 0.62 mol/l and the arginine concentration of 50.0 g/l.

The salty taste enhancing activity of the samples was evaluated according to the method of evaluation of salty taste enhancing activity 2. When the salt concentration was 0.1 mol/l, the equivalent salt concentration of sample 1 was 0.126 mol/l at the peptide concentration of 1% and the equivalent salt concentration of sample 2 was 0.126 mol/l at the peptide concentration of 0.4%, 0.140 mol/l at 0.8%, 0.156 mol/l at 1.0% (w/v) and 0.162 mol/l at 1.25% (w/v).

The equivalent salt concentrations of solutions containing 0.8% of the peptide of sample 2 and having the salt concentrations of 0.05 mol/l, 0.10 mol/l, 0.15 mol/l and 0.20 mol/l were 0.069 mol/l, 0.140 mol/l, 0.222 mol/l and 0.291 mol/l, respectively. It means that the salty taste of the salt solutions was enhanced by 1.38 times, 1.40 times, 1.48 times and 1.46 times, respectively.

Example 5

Wheat gluten (67 g, T-N: 118 mg/g, amide nitrogen: 1.88 mmol/g, Weston Foods), a soybean protein isolate (60 g, T-N: 132 mg/g, amide nitrogen: 0.958 mmol/g, Fuji Oil Co., Ltd.), casein (50 g, T-N: 133 mg/g, amide nitrogen: 0.785 mmol/g, Sigma Chemical Co.) and zein (50 g, T-N: 135 mg/g, amide nitrogen: 1.62 mmol/g, Sigma Chemical Co.) were dispersed respectively in 433 ml, 440 ml, 450 ml and 450 ml of 0.6 mol/l hydrochloric acid. Each of the resulting dispersions was heated in an autoclave at 120° C. for 120 minutes for deamidation. The deamidation rate was about 90% in the gluten dispersion and the soybean protein isolate dispersion and was about 100% in the casein dispersion and the zein dispersion. After cooling to 50° C., each reaction solution was adjusted to pH 8.0 with 6 mol/l sodium hydroxide. Then, 1 ml of a proteolytic enzyme (alkalase, Novo Nordisk A/S) was added thereto and hydrolysis was carried out at 50° C. for 20 hours. During the reaction, the pH was maintained at 8.0 with 6 mol/l sodium hydroxide. After the completion of hydrolysis, the hydrolyzates were adjusted to pH 6.0 with 6 mol/l hydrochloric acid and heated at 85 to 90° C. for 20 minutes to inactivate the enzyme, followed by centrifugation, and filtration only when the supernatant was turbid, to obtain clear degradation solutions in the respective amounts of 415 ml, 415 ml, 498 ml and 452 ml. The concentrations of the total nitrogen were respectively 16.27 g/l, 14.91 g/l, 12.70 g/l and 10.99 g/l, and the salt concentrations were respectively 0.704 mol/l, 0.774 mol/l, 0.732 mol/l and 0.690 mol/l.

Test solutions were prepared by adding salt to the 10-fold diluted degradation solutions so that the salt concentration becomes 0.1 mol/l.

Evaluation of salty taste enhancing activity was made on the prepared test solutions according to the method of evaluation 1, and the grade was 2 for all the solutions.

Then, evaluation of salty taste enhancing activity in the presence of arginine was made according to the method of evaluation 1. Test solutions were prepared by adjusting the peptide concentration to one tenth of that in the degradation solutions, the salt concentration to 0.1 mol/l and the arginine concentration to 0.012 mol/l (2.09 g/l) by the use of arginine hydrochloride.

As a result of evaluation, the grade of the test solutions prepared using arginine hydrochloride was 4. This result indicates that peptides obtained by subjecting a wide variety of proteins to hydrolysis and deamidation have salty taste enhancing activity and that arginine further reinforces the activity.

In order to confirm that the peptides obtained by hydrolyzing a protein have salty taste enhancing activity and this activity is not attributable to ammonium salts formed by the degradation of amide bond or free amino acids formed by the acid treatment or the enzymatic degradation, the degradation product was treated with a strongly acidic cation exchange resin of high crosslinking degree, and the obtained solution freed from ammonium ion, free amino acids and a part of peptides of low molecular weight was examined for salty taste enhancing activity. As the strongly acidic cation exchange resin of high crosslinking degree, DIAION SK116 (Mitsubishi Chemical Corporation) was used.

Removal of ammonium ion, free amino acids, and peptides of low molecular weight from the degradation solution was carried out in the following manner. After 50 ml of the degradation solution was passed through a column packed with 250 ml of the ion exchange resin (type H), water was made to flow to obtain 750 ml of an effluent. The obtained eluate was concentrated, adjusted to pH 6.5 with 6 mol/l sodium hydroxide, and made up to 100 ml with water. Then, 2 mol/l ammonia was passed through the column to obtain 750 ml of an eluate. The obtained eluate was concentrated, adjusted to pH 6.5 with 2 mol/l hydrochloric acid, and made up to 100 ml with water. The pH before the adjustment was in the range of 6.5 to 7.2. The concentrations of free amino acids and ammonia and the average peptide length were determined for the degradation solution and the effluent.

The results are shown in Table 4. The concentrations in the effluent and the eluate were converted on the basis of 50 ml of the degradation solution

TABLE 4

| | Free amino acids (g/l) | | Ammonia (mmol/l) | | Average peptide length | |
|---|---|---|---|---|---|---|
| | Degradation solution | Effluent | Degradation solution | Effluent | Degradation solution | Effluent |
| Gluten | 7.26 | 0.02 | 229 | 0.41 | 4.87 | 8.06 |
| Soybean protein | 12.68 | 0.04 | 102 | 0.41 | 3.17 | 5.88 |
| Casein | 12.48 | 0.03 | 77 | 0.10 | 2.69 | 4.35 |
| Zein | 10.36 | 0.11 | 170 | 0.32 | 2.38 | 6.29 |

The concentrations of free amino acids and ammonia in the effluent were not more than 1/100 of those in the degradation solution, which means removal of most of the free amino acids and ammonia. The change in the average peptide length indicates that the free amino acids and the peptides of low molecule weight were fractionated into the eluate and the long peptides into the effluent. The average peptide length of the degradation solution is much shorter than that of an ordinary degradation product by exopeptidase because of the heating treatment with hydrochloric acid for deamidation.

Evaluation of salty taste enhancing activity was made on the effluent and the eluate after 5-fold dilution in the presence of 0.012 mol/l arginine according to the method of evaluation 1. All of the effluents got grade 4 and all of the eluates got grade 0. Five-fold diluted solutions containing both the effluent and the eluate got grade 4, which was the same as that of the degradation solution. In the absence of arginine, the effluents got grade 2, the eluates got grade 0 and the mixtures thereof got grade 2, thus showing the same tendency.

From these results, it was confirmed that the free amino acids and the ammonium salts in the degradation solution are not essential for the expression of the salty taste enhancing activity of the degradation product.

The degradation solution of each protein (100 ml) was injected into a dialysis tube (Wako Pure Chemical Industries, Ltd., fractionation molecular weight: 12,000 to 14,000), followed by dialysis with running water for 2 days and nights. The dialyzed solution was made up to 200 ml with distilled water. The concentrations of free amino acids and ammonia and the average peptide length in the dialyzed solution were determined using the prepared solution.

The results are shown in Table 5. Each concentration was converted on the basis of 100 ml of the degradation solution.

TABLE 5

|  | Free amino acids (g/l) | Ammonia (mmol/l) | Average peptide length |
| --- | --- | --- | --- |
| Gluten | 0.03 | 2.08 | 22.1 |
| Soybean protein | 0.02 | 0.98 | 7.9 |
| Casein | 0.01 | 0.58 | 6.7 |
| Zein | 0.01 | 1.14 | 11.3 |

The concentrations of free amino acids and ammonia in the dialyzed solutions were not more than 1% of those in the degradation solutions.

Evaluation of salty taste enhancing activity was made according to the method of evaluation 1 on the 5-fold diluted dialyzed solutions having a salt concentration of 0.1 mol/l, and as controls, the 10-fold diluted degradation solutions having the same salt concentration. In the absence of arginine, all of the diluted dialyzed solutions and the diluted degradation solutions got grade 2 and showed almost equal enhancing activities. In the presence of arginine, all of the dilutions got grade 4 and showed almost equal enhancing activities. This result, as well as the result of the above fractionation using the ion exchange resin, indicates that free amino acids and ammonium salts are not components essential for the expression of the salty taste enhancing activity of the present invention. The result also indicates that the active ingredient which exhibits salty taste enhancing activity is not low molecular peptides. None of the dialyzed solutions per se had a salty taste.

The proteins used as materials, the degradation solutions and the dialyzed solutions were degraded with hydrochloric acid and their amino acid compositions were analyzed to calculate the ratio of the acidic amino acid weight (wt %) based on the total amino acid weight.

The results are shown in Table 6.

TABLE 6

|  | In the protein (wt %) | In the degradation solution (wt %) | In the dialyzed solution (wt %) |
| --- | --- | --- | --- |
| Gluten | 41.9 | 43.0 | 48.5 |
| Soybean protein | 32.4 | 34.3 | 38.6 |
| Casein | 29.1 | 28.9 | 31.4 |
| Zein | 29.7 | 30.5 | 39.7 |

The ratio of acidic amino acids (mol %) based on the total amino acids was calculated from the amino acid composition.

The results are shown in Table 7.

TABLE 7

|  | In the protein (mol %) | In the degradation solution (mol %) | In the dialyzed solution (mol %) |
| --- | --- | --- | --- |
| Gluten | 37.9 | 39.5 | 44.9 |
| Soybean protein | 30.0 | 31.8 | 36.9 |
| Casein | 26.8 | 26.6 | 29.9 |
| Zein | 26.3 | 27.0 | 36.7 |

In the dialyzed solutions having salty taste enhancing activity, the percentage (both wt % and mol %) of the acidic amino acids was increased compared with those in the proteins and the degradation solutions, which indicates that the existence ratio of acidic peptides rose.

To determine the molecular weight of the peptides having salty taste enhancing activity, gel filtration was carried out. Samples were prepared by decoloring respective degradation solutions with activated carbon and concentrating them to half of their original volumes, followed by removal of salt by desalting. Desalting was carried out by electrodialysis using Micro Acylizer S1 (Asahi Kasei Corporation). As the gel, Superdex 75 Prep Grade (Pharmacia Biotech) was used. Gel filtration was carried out using a column (gel bed: diameter, 5 cm; height, 50 cm) buffered with 0.02 mol/l phosphate-0.1 mol/l sodium chloride buffer (pH 6.8). Prior to the filtration, as standard substances, vitamin $B_{12}$ having a molecular weight of 1,355 and standard proteins having molecular weights of 6,500 to 67,000 were fractionated to measure the elution positions, and the elution positions of three fractions respectively having molecular weights of less than 2,300, 2,300 to 7,300 and more than 7,300 were determined. As a control for sensory evaluation of salty taste enhancing activity, 0.02 mol/l phosphate-0.1 mol/l sodium chloride buffer (pH 6.8) was used. The amount of each sample was 10 ml.

As a result of sensory evaluation of the salty taste enhancing activity of each fraction, the enhancing activity was observed in all of the fractions for four kinds of proteins and the molecular weights of active peptides showed a wide range. The maximum molecular weight of the peptides in the samples was 27,000 to 30,000.

Example 6

Solutions obtained by deamidation of commercially available peptide products containing glutamine at high concentrations were examined for salty taste enhancing activity.

As the peptide products, glutamine peptides WGE 80 GPN and glutamine peptides WGE 80 GPU (both products of DMV International Co., Ltd.) were used. Glutamine peptides WGE 80 GPN having the glutamine content of 25% (w/w) has an average molecular weight of 670 and contains 66% (w/w) peptides having a molecular weight of less than 500, 19% peptides having a molecular weight of 500 to 1,000 and 15% (w/w) peptides having a molecular weight of 1,000 to 10,000. Glutamine peptides WGE 80 GPU having the glutamine content of 29% (w/w) has an average molecular weight of 6,700 and contains 14% (w/w) peptides having a molecular weight of less than 500, 11% (w/w) peptides having a molecular weight of 500 to 1,000 and 75% (w/w) peptides having a molecular weight of more than 1,000. Glutamine peptides WGE 80 GPU contains peptides having a molecular weight of more than 10,000 in an amount of 23%.

Each of the peptide products was dissolved in 0.65 mol/l hydrochloric acid to give the peptide concentration of 10%. The resulting solution was heated at 115° C. for 90 minutes for deamidation, followed by neutralization with 6 mol/l sodium hydroxide.

Evaluation of salty taste enhancing activity was made using the neutralized solutions. As test solutions, aqueous solutions each comprising 0.4% (w/v) peptides, 0.1 mol/l salt and 0.012 mol/l arginine were prepared, and as a control, an aqueous solution comprising 0.1 mol/l salt and 0.012 mol/l arginine was prepared to evaluate the strength of salty taste. As a result, the salty taste of deamidated glutamine peptides WGE 80 GPN having a low molecular weight was the same as that of the control and the enhancing activity was not detected. The salty taste of deamidated glutamine peptides WGE 80 GPU having a high molecular weight was stronger than that of the control and this deamidation product was found to have the enhancing activity.

Example 7

Alkalase (8 g) was dissolved in 3,400 ml of warm water (60° C.) and 600 g of gluten was dispersed therein, followed by reaction at 60° C. for 20 hours. During the reaction, the pH of the dispersion was maintained at 7.0 with 6 mol/l sodium hydroxide. After the temperature was lowered to 55° C., 1 g of Sumizyme FP (Shin Nihon Chemical Co., Ltd.) was added to the reaction mixture, and the resulting mixture was subjected to reaction for 10 hours to obtain 3,805 ml of an enzymatic degradation solution. To 3,780 ml of the obtained degradation solution was added 280 ml of concentrated hydrochloric acid, followed by heating at 120° C. for 15 minutes for deamidation. To the deamidated solution was added 490 ml of 6 mol/l sodium hydroxide to neutralize the solution, and 70 g of activated carbon was added thereto for decolorization. The obtained decolorized solution was concentrated to obtain 2,060 ml of a concentrated solution.

In 1,960 ml of the obtained concentrated solution were dissolved 172 g of arginine and 72 g of citric acid monohydrate to obtain 2,130 ml of a liquid salty taste enhancer containing arginine. This enhancer comprised 161 g/l peptides, 81 g/l arginine and 79 g/l salt.

A portion of the concentrated solution was dried by spraying at a hot-air supplying temperature of 175 to 180° C. and at an evacuation temperature of 90° C. to obtain a powdery salty taste enhancer. The enhancer comprised 38.0% (w/w) peptides, 19.0% (w/w) arginine and 16.9% (w/w) salt. Evaluation of salty taste enhancing activity was made on this powder using 0.1 mol/l salt solutions comprising the peptides in an amount of 0.4% (w/v) and 0.6% (w/v), respectively. The equivalent salt concentrations were 0.127 mol/l and 0.135 mol/l, respectively.

Example 8

Peptides were fractionated into an acidic fraction and a neutral and basic fraction, and their salty taste enhancing activity and amino acid compositions were examined.

Fractionation of a peptide mixture into an acidic peptide fraction and a neutral and basic fraction was carried out by ion exchange chromatography. As the ion exchanger, SP-Sepharose Fast Flow (Pharmacia Biotech) was used.

The peptide solution containing no arginine (sample 1) obtained in Example 4 and the degradation solution obtained from a soybean protein isolate in Example 5 were used as samples for fractionation. The degradation solution from a soybean protein isolate was decolorized and concentrated according to the method of Example 4. These peptide solutions were concentrated and then subjected to desalting. To each of the resulting solutions were added a 1 mol/l citric acid solution and water to adjust the peptide concentration to ca. 100 g/l and to adjust the pH to 3.5. Each of the resulting solutions (70 ml) was passed through a column of an ion exchanger (gel bed: diameter, 2.6 cm; height, 26 cm) buffered with 0.02 mol/l citrate buffer (pH 3.5), and then the same buffer was made to flow. The first 110 ml of the effluent was discarded and the next 300 ml of the effluent was obtained as an acid peptide fraction. Then, the adsorbed peptides were eluted with an aqueous solution comprising 0.02 mol/l phosphate buffer (pH 8.8) and 0.5 mol/l salt to obtain 300 ml of the eluate as a neutral and basic fraction. Each of the obtained fractions was adjusted to pH 7.0 with 6 mol/l sodium hydroxide solution. The neutral and basic fraction was concentrated to ca. 40 ml, followed by desalting.

The desalted degradation solutions and fractions were subjected to determination of free amino acids, and after further degradation with hydrochloric acid, to determination of total amino acids. The amino acid composition of peptides was determined by subtracting the amount of free amino acid from the amount of total amino acid for each amino acid. From this amino acid composition, the ratios of the acidic amino acids and the basic amino acids based on the total amino acids (mol %) were calculated.

The results are shown in Table 8.

TABLE 8

|  | Acidic amino acids | Basic amino acids |
|---|---|---|
| Gluten: |  |  |
| Degradation solution | 35.2 | 4.4 |
| Acidic fraction | 47.2 | 0.1> |
| Neutral and basic fraction | 18.8 | 31.2 |
| Soybean protein: |  |  |
| Degradation solution | 27.5 | 15.6 |
| Acidic fraction | 33.8 | 3.4 |
| Neutral and basic fraction | 16.4 | 34.7 |

As clear from Table 8, with either protein, the acidic fraction contained a higher ratio of acidic amino acids and a lower ratio of basic amino acids as compared with the degradation solution. The neutral and basic fraction contained a lower ratio of acidic amino acids and a higher ratio of basic amino acids as compared with the degradation solution.

The ratios of acidic amino acids in the degradation solutions in the above result are lower than those shown in Table 7 of Example 5. It is because that more than half of the acidic acids, specifically aspartic acid, in the proteins were converted into free amino acids by the enzymatic degradation and the deamidation with acid.

The degradation solutions and their fractions were examined for salty taste enhancing activity From each degradation solution was prepared a test solution having the peptide concentration of 0.4% (w/v) and the salt concentration of 0.1 mol/l. From each fraction was prepared a test solution having the same dilution as that of the test solution of the degradation solution and having the salt concentration of 0.1 mol/l. As a control, a 0.1 mol/l salt solution was used.

Evaluation of salty taste enhancing activity was made on these test solutions. As a result, the salty taste enhancing activity was detected in the acidic fractions, but not in the neutral and basic fractions.

A salty taste was not recognized in any of the degradation solutions, the acidic fractions and the neutral and basic fractions. It was also confirmed that the strength of the salty taste of an aqueous solution (pH 7.0) comprising 0.1 mol/l salt and 0.02 mol/l sodium citrate was the same as that of a 0.1 mol/l salt solution, and it did not affect the above results.

Example 9

The degradation products obtained in Examples 1 and 2 were added, as salty taste enhancers, to soup having a vegetable flavor and their salty taste enhancing activity was examined. The composition of a soup mix excluding salt is shown in Table 9.

TABLE 9

| Ingredient | Amount (g) |
|---|---|
| Sodium glutamate | 62.0 |
| 1:1 mixture of sodium inosinate and sodium guanylate | 7.0 |
| Trisodium citrate | 4.0 |
| Granulated sugar | 69.0 |
| Celery powder | 0.2 |
| White pepper | 6.0 |
| Garlic powder | 1.0 |
| Onion powder | 23.0 |
| Total | 172.0 |

Soup (1 liter) was prepared by dissolving the soup mix having the composition shown in Table 9 and salt or the degradation product in hot water.

Subjects and their compositions are shown in Table 10.

TABLE 10

| Subject | Soup mix (g) | Salt (g) | Degradation product (ml) |
|---|---|---|---|
| Control 1 | 5.0 | 10.00 | 0 |
| Control 2 (20% salt-reduced) | 5.0 | 8.00 | 0 |
| Control 3 (30% salt-reduced) | 5.0 | 7.00 | 0 |
| Sample 1: degradation product of Example 1 (20% salt-reduced) | 5.0 | 4.65 | 114 |
| Sample 2: degradation product of Example 2 (20% salt-reduced) | 5.0 | 5.68 | 114 |
| Sample 3: degradation product of Example 2 (30% salt-reduced) | 5.0 | 4.70 | 100 |

As control 1 shown in Table 10, a soup containing the above soup mix in a concentration of 0.5% (w/v) and salt in a concentration of 1% (w/v) was prepared. Samples 1 to 3 respectively contain, as the peptides, almost the same amount of the degradation product as the salt in the soup. As the amount of sodium derived from the ingredients was only slight, its effect on the value of the salt reduction rate was ignored.

Evaluation of the strength of salty taste was made by the grading method widely employed in sensory evaluation of foods. Soups were evaluated into 7 grades regarding the strength of the salty taste of the soup having the salt concentration of 1% (w/v) as 5. Soups having the salt concentration reduced by 20% and 30%, respectively, and containing no salty taste enhancer of the present invention were also prepared as controls for evaluation of the strength of salty taste.

The result of sensory evaluation of salty taste made on the 20% salt-reduced soups by 10 panelists is shown in Table 11. The results on the subjects which differed significantly from control 1 (the soup having salt concentration of 1%) at the 5% level of significance by t-test were indicated by the mark *.

TABLE 11

| Subject | Salty taste |
|---|---|
| Control 1 | 5.0 |
| Control 2 | 3.3* |
| Sample 1: degradation product of Example 1 (20% salt-reduced) | 4.2 |
| Sample 2: degradation product of Example 2 (20% salt-reduced) | 6.0* |

As shown in Table 11, sample 1 had an obviously enhanced salty taste compared with control 2 (20% salt-reduced). Sample 2 had a significantly and obviously stronger salty taste than control 1. The use of the salty taste enhancers did not have a significant effect on the soups in respect of tastes other than the salty taste.

The result of sensory evaluation of salty taste made on the 30% salt-reduced soups by 10 panelists is shown in Table 12.

TABLE 12

| Subject | Salty taste |
|---|---|
| Control 1 | 5.0 |
| Control 3 | 3.2* |
| Sample 3: degradation product of Example 2 (30% salt-reduced) | 4.5 |

As shown in Table 12, the 30% salt-reduced soup prepared using the salty taste enhancer of Example 2 had an enhanced salty taste compared with the 30% salt-reduced soup. The use of the salty taste enhancer did not have a significant effect on the soup in respect of tastes other than the salty taste.

Example 10

A 30% salt-reduced soup (sample 4) was prepared by adding disodium succinate to the soup of sample 3 described in Example 9 to a concentration of 0.02% (w/v).

The result of sensory evaluation of salty taste made on the 30% salt-reduced soups by 14 panelists is shown in Table 13.

TABLE 13

| Subject | Salty taste |
|---|---|
| Control 1 | 5.0 |
| Control 3 | 2.8* |
| Sample 4: degradation product of Example 2 and 0.02% disodium succinate (30% salt-reduced) | 5.1 |

As shown in Table 13, the addition of 0.02% disodium succinate enhanced the action of the peptides obtained by subjecting a protein to hydrolysis and deamidation as a salty taste enhancer. The use of the salty taste enhancer did not have a significant effect on the soup in respect of tastes other than the salty taste.

Example 11

To 1,000 ml of the liquid salty taste enhancer obtained in Example 7 was added 80 g of salt and the resulting mixture was dried by spraying to obtain a salty taste-enhanced seasoning agent. This product contains peptides and salt in almost equal amounts and can be used as table salt having a low salt content.

Example 12

The powdery salty taste enhancer obtained in Example 7 was added to miso soup, soup for Japanese noodle and soup for Chinese noodle, and its salty taste enhancing activity was evaluated.

Miso soups were prepared according to the recipe shown in Table 14. Soup stock was obtained by adding 40 g of flakes of dried bonito to 4 l of hot water.

TABLE 14

| Subject | Composition | | Amount of salt | |
|---|---|---|---|---|
| Control 1 | Soup stock | 950 ml | | |
| | Miso | 30 g | 2.85 g | |
| | Salt | 7.15 g | 7.15 g | |
| | Salt content | 1.0% | | (10 g) |
| Control 2 (25% salt-reduced) | Soup stock | 950 ml | | |
| | Miso | 30 g | 2.85 g | |
| | Salt | 4.65 g | 4.65 g | |
| | Salt content | 0.75% | | (7.5 g) |
| Sample (25% salt-reduced) | Soup stock | 950 ml | | |
| | Miso | 30 g | 2.85 g | |
| | Salt | 1.98 g | 1.98 g | |
| | Salty taste enhancer | 15.79 g | 2.67 g | |
| | Salt content | 0.75% | | (7.5 g) |

Soups for Japanese noodle were prepared according to the recipe shown in Table 15. Soup stock was obtained in the following manner. In 3 l of water were put 40 g of boiled and dried sardines, 30 g of dried sea tangle and 15 g of dried shiitake mushrooms, followed by heating. When the water started boiling, the dried sea tangle was taken out, and the flame was turned down. Then 50 g of flakes of dried bonito was put in the water, followed by heating until shiitake mushrooms were boiled enough. As the soy sauce, low salt soy sauce (Kikkoman Corporation) was used.

TABLE 15

| Subject | Composition | | Amount of salt | |
|---|---|---|---|---|
| Control 1 | Soup stock | 650 ml | | |
| | Mirin (a sweet sake used as seasoning) | 100 ml | | |
| | Soy sauce | 50 ml | 4.33 g | |
| | Salt | 6.07 g | 6.07 g | |
| | Salt content | 1.3% | | (10.4 g) |
| Control 2 (25% salt-reduced) | Soup stock | 650 ml | | |
| | Mirin | 100 ml | | |
| | Soy sauce | 50 ml | 4.33 g | |
| | Salt | 3.47 g | 3.47 g | |
| | Salt content | 0.975% | | (7.8 g) |
| Sample (25% salt-reduced) | Soup stock | 650 ml | | |
| | Mirin | 100 ml | | |
| | Soy sauce | 50 ml | 4.33 g | |
| | Salt | 1.33 g | 1.33 g | |
| | Salty taste enhancer | 12.63 g | 2.14 g | |
| | Salt content | 0.975% | | (7.8 g) |

Soups for Chinese noodle were prepared according to the recipe shown in Table 16. As the pork bone extract, Xiang Lu Qing Tang (Kyowa Hakko Kogyo Co., Ltd.) was used. The soup mix comprises 100 g of sodium glutamate, 4 g of WMP (a 1:1 mixture of sodium inosinate and sodium guanylate, Kyowa Hakko Kogyo Co., Ltd.), 30 g of white soft sugar, 5 g of pepper, 3 g of ginger, 20 g of onion, 5 g of garlic and 2 g of seasoned bamboo shoot (all powder). Soy sauce is the same as the one used in the soups for Japanese noodle.

TABLE 16

| Subject | Composition | | Amount of salt | |
|---|---|---|---|---|
| Control 1 | Pork bone extract | 70 ml | | |
| | Soup mix | 3.5 g | | |
| | Soy sauce | 30 ml | 2.6 g | |
| | Salt | 10.4 g | 10.4 g | |
| | Salt content | 1.3% | | (13 g) |
| Control 2 (25% salt-reduced) | Pork bone extract | 70 ml | | |
| | Soup mix | 3.5 g | | |
| | Soy sauce | 30 ml | 2.6 g | |
| | Salt | 7.15 g | 7.15 g | |
| | Salt content | 0.975% | | (9.75 g) |
| Sample (25% salt-reduced) | Pork bone extract | 70 ml | | |
| | Soup mix | 3.5 g | | |
| | Soy sauce | 30 ml | 2.6 g | |
| | Salt | 4.48 g | 4.48 g | |
| | Salty taste enhancer | 15.79 g | 2.67 g | |
| | Salt content | 0.975% | | (9.75 g) |

The results of evaluation are shown in Table 17. With all kinds of foods tested, no significant difference was recognized at the 5% level of significance between the food without salt reduction (control 1) and the 25% salt-reduced food containing the salty taste enhancer of the present invention. As to the tastes other than salty taste, there clearly recognized the improvement specifically in the miso soup and the soup for Japanese noodle in respect of the flavor and umami. This result also indicates that the salt-reducing effect can be presumed by the equivalent salt concentration obtained by the method of evaluation of salty taste enhancing activity 2.

TABLE 17

| Subject | Salty taste |
|---|---|
| Control 1 | 5.0 |
| Control 2 | 2.5 |
| Sample: Miso soup | 5.2 |
| Soup for Japanese noodle | 5.1 |
| Soup for Chinese noodle | 4.7 |

Industrial Applicability

The present invention provides a method of enhancing the salty taste of a food or beverage containing salt, and a salty taste enhancer and a salty taste seasoning agent for use therein. The present invention also provides a low salt food or beverage.

What is claimed is:

1. A method of enhancing the salty taste of a food or beverage containing salt, which comprises adding a purified and isolated acidic peptide to the food or beverage, said acidic peptide having a molecular weight from 400 to 30,000, wherein the acidic peptide comprises at least 20% acidic amino acids and the acidic peptide contains more acidic amino acids than basic amino acids.

2. The method according to claim 1, wherein the acidic peptide is an acidic peptide which is obtainable by subjecting a protein to hydrolysis.

3. The method according to claim 1, wherein the acidic peptide is an acidic peptide which is obtainable by subjecting a protein to hydrolysis and deamidation.

4. The method according to claim 1, wherein the acidic peptide comprises at least 30% acidic amino acids.

5. The method according to claim 4, wherein the acidic peptide has a molecular weight from 700 to 27,000.

6. The method according to claim 5, wherein the acidic peptide is from 6 to 230 amino acids.

7. The method according to any of claims 1 to 3 or 4 to 6, which further comprises adding succinic acid to the food or beverage.

8. The method according to claim 7, wherein the concentration of succinic acid is 0.001 to 0.1%.

9. The method according to any of claims 1 to 3 or 4 to 6, which further comprises adding a basic substance to the food or beverage.

10. The method according to claims 9, wherein the concentration of the basic substance is 3 to 50 mmol/kg.

11. The method according to claim 10, wherein the basic substance is a basic amino acid.

12. The method according to claim 11, wherein the basic amino acid is arginine.

13. The method according to claim 12, wherein the concentration of arginine is 0.04 to 0.9%.

14. A salty taste enhancer comprising an admixture of a purified and isolated acidic peptide and a comestibly acceptable carrier, said acidic peptide having a molecular weight from 400 to 30,000, wherein the acidic peptide comprises at least 20% acidic amino acids and the acidic peptide contains more acidic amino acids than basic amino acids.

15. The salty taste enhancer according to claim 14, wherein the acidic peptide is an acidic peptide which is obtainable by subjecting a protein to hydrolysis.

16. The salty taste enhancer according to claim 14, wherein the acidic peptide is an acidic peptide which is obtainable by subjecting a protein to hydrolysis and deamidation.

17. The salty taste enhancer according to claim 14, wherein the acidic peptide comprises at least 30% acidic amino acids.

18. The salty taste enhancer according to claim 17, wherein the acidic peptide has a molecular weight from 700 to 27,000.

19. The salty taste enhancer according to claim 18, wherein the acidic peptide is from 6 to 230 amino acids.

20. The salty taste enhancer according to any of claims 14 to 16 or 17 to 19, further comprising a basic substance.

21. The salty taste enhancer according to claim 20, wherein the concentration of the basic substance is 3 to 50 mmol/kg.

22. The salty taste enhancer according to claim 21, wherein the basic substance is a basic amino acid.

23. The salty taste enhancer according to claim 22, wherein the basic amino acid is arginine.

24. The salty taste enhancer according to claim 23, wherein the concentration of arginine is 0.04 to 0.9%.

25. The salty taste enhancer according to any of claims 14 to 16 or 17 to 19, further comprising succinic acid.

26. The salty taste enhancer according to claim 25, wherein the concentration of succinic acid is 0.0001 to 0.1.

27. A food or beverage comprising the salty taste enhancer according to any of claims 14 to 16 or 17 to 19.

28. A food or beverage comprising salt and the salty taste enhancer according to any of claims 14 to 16 or 17 to 19.

29. A salty taste seasoning agent comprising an admixture of a purified and isolated acidic peptide and a salt, said acidic peptide having a molecular weight from 400 to 30,000, wherein the acidic peptide comprises at least 20% acidic amino acids and the acidic peptide contains more acidic amino acids than basic amino acids.

30. The salty taste seasoning agent according to claim 29, wherein the acidic peptide is an acidic peptide which is obtainable by subjecting a protein to hydrolysis.

31. The salty taste seasoning agent according to claim 29, wherein the acidic peptide is an acidic peptide which is obtainable by subjecting a protein to hydrolysis and deamidation.

32. The salty taste seasoning agent according to claim 29, wherein the acidic peptide comprises at least 30% acidic amino acids.

33. The salty taste seasoning agent according to claim 32, wherein the acidic peptide has a molecular weight from 700 to 27,000.

34. The salty taste seasoning agent according to claim 33, wherein the acidic peptide is from 6 to 230 amino acids.

35. The salty taste seasoning agent according to any of claims 29 to 31 or 32 to 34, further comprising succinic acid.

36. The salty taste enhancer according to claim 35, wherein the concentration of succinic acid is 0.001 to 0.1%.

37. A food or beverage comprising the salty taste seasoning agent according to any of claims 29 to 31 or 32 to 34.

38. The salty taste seasoning agent according to any of claims 29 to 31 or 32 to 34, further comprising a basic substance.

39. The salty taste seasoning agent according to claim 38, wherein the concentration of the basic substance is 3 to 50 mmol/kg.

40. The salty taste seasoning agent according to claim 39, wherein the basic substance is a basic amino acid.

41. The salty taste seasoning agent according to claim 40, wherein the basic amino acid is arginine.

42. The salty taste seasoning agent according to claim 41, wherein the concentration of arginine is 0.04 to 0.9%.

* * * * *

UNITED STATES PATENT AND TRADEMARK OFFICE
CERTIFICATE OF CORRECTION

PATENT NO. : 6,974,597 B2
DATED : December 13, 2005
INVENTOR(S) : Shigenori Ohta et al.

It is certified that error appears in the above-identified patent and that said Letters Patent is hereby corrected as shown below:

<u>Title page,</u>
Item [56], References Cited, OTHER PUBLICATIONS,
"Maehashi, et al.," reference, "V I. 63," should read -- Vol. 63, --;
"Seki, et al.," reference, "Argic." should read -- Agric. --;
"Finley," reference, "Sci nce," should read -- Science, --;
"Kato, et al.," reference, "Deamidati n" should read -- Deamidation --;
"Matsadomi, et al.," reference, V 1. 50," should read -- Vol. 50, --; and
"Iwami, et al.," reference, "Ch m.," should read -- Chem., --.
Item [30], Foreign Application Priority Data, "Dec. 27, 1999" should read -- Dec. 24, 1999 --.

<u>Column 3,</u>
Line 53, "researches have" should read -- research has --.

<u>Column 18,</u>
Lines 42 and 47, "has" should read -- have --; and
Lines 42, 48 and 52, "contains" should read -- contain --.

<u>Column 24,</u>
Line 25, "there" should read -- there was --.

<u>Column 25,</u>
Lines 1 and 6, "to 3 or 4" should be deleted; and
Line 39, "to 16 or 17" should be deleted.

UNITED STATES PATENT AND TRADEMARK OFFICE
CERTIFICATE OF CORRECTION

PATENT NO. : 6,974,597 B2
DATED : December 13, 2005
INVENTOR(S) : Shigenori Ohta et al.

It is certified that error appears in the above-identified patent and that said Letters Patent is hereby corrected as shown below:

<u>Column 26,</u>
Lines 2, 6 and 8, "to 16 or 17" should be deleted;
Line 4, "0.0001 to 0.1," should read -- 0.001 to 0.1% --;
Lines 30, 34 and 36, "to 31 or 32" should be deleted; and
Line 31, "enhancer" should read -- seasoning agent --.

Signed and Sealed this

Thirtieth Day of May, 2006

JON W. DUDAS
*Director of the United States Patent and Trademark Office*